United States Patent
Nagata et al.

(10) Patent No.: US 12,410,842 B2
(45) Date of Patent: Sep. 9, 2025

(54) SYSTEMS AND METHODS FOR DETECTING EXCESSIVE OR UNEVEN WEAR ON A BRAKE PAD OR A ROTOR OF A VEHICLE

(71) Applicant: Toyota Motor Engineering & Manufacturing North America, Inc., Plano, TX (US)

(72) Inventors: Katsumi Nagata, Foster City, CA (US); Masashi Nakagawa, Toyota (JP)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 645 days.

(21) Appl. No.: 17/689,944

(22) Filed: Mar. 8, 2022

(65) Prior Publication Data

US 2023/0304555 A1   Sep. 28, 2023

(51) Int. Cl.
*F16D 66/02* (2006.01)
*B60T 17/22* (2006.01)

(52) U.S. Cl.
CPC ............ *F16D 66/027* (2013.01); *B60T 17/22* (2013.01)

(58) Field of Classification Search
None
See application file for complete search history.

(56) References Cited

U.S. PATENT DOCUMENTS

| | | |
|---|---|---|
| 4,204,190 A | 5/1980 | Wiley et al. |
| 6,360,850 B1 | 3/2002 | Odisho et al. |
| 6,384,721 B1 | 5/2002 | Paieli |
| 7,165,657 B2 | 1/2007 | Palladino |
| 7,877,216 B2 | 1/2011 | Wright |
| 8,434,353 B2 | 5/2013 | Wallace et al. |
| 8,437,934 B2 | 5/2013 | Degenstein |
| 10,167,916 B2 | 1/2019 | Lin et al. |

(Continued)

FOREIGN PATENT DOCUMENTS

| | | | | |
|---|---|---|---|---|
| CN | 202484165 U | * | 10/2012 | |
| CN | 104653665 A | * | 5/2015 | |
| CN | 108458008 A | * | 8/2018 | ............ F16D 65/04 |

(Continued)

OTHER PUBLICATIONS

English Machine Translation CN-104653665-A (Year: 2015).*
English Machine Translation CN-202484165-U (Year: 2012).*
English Machine Translation CN-108458008-A (Year: 2018).*

*Primary Examiner* — Melanie Torres Williams
(74) *Attorney, Agent, or Firm* — Snell & Wilmer LLP

(57) ABSTRACT

A system for detecting excessive or uneven wear on a brake pad of a vehicle. The system includes a rotor connected to a wheel of the vehicle, a brake pad positioned adjacent to the rotor and configured to contact the rotor to slow down or stop movement of the rotor and the wheel, and a wire mesh disposed within or integrated into the brake pad. The system also includes a sensor configured to detect sensor data from the wire mesh and an electronic control unit (ECU) configured to determine, based on the sensor data, whether excessive or uneven wear on the brake pad or the rotor is present and to control an output device to display an output related to the excessive or uneven wear on the brake pad or the rotor. The system may utilize an artificial intelligence or machine learning model to detect the excessive or uneven wear.

20 Claims, 6 Drawing Sheets

(56) References Cited

U.S. PATENT DOCUMENTS

2004/0069573 A1 4/2004 Anderson
2019/0389442 A1* 12/2019 Kim .................. B60T 8/172

FOREIGN PATENT DOCUMENTS

| CN | 111365392 | 7/2020 |
|---|---|---|
| DE | 4231107 A1 | 3/1994 |
| DE | 102016215725 A1 | 2/2018 |
| WO | WO2018178018 A1 | 10/2018 |
| WO | WO2018211041 A1 | 11/2018 |

* cited by examiner

SYSTEMS AND METHODS FOR DETECTING EXCESSIVE OR UNEVEN WEAR ON A BRAKE PAD OR A ROTOR OF A VEHICLE

BACKGROUND

Field

The present disclosure relates to systems and methods for detecting excessive or uneven wear on a brake pad or a rotor of a vehicle.

Description of the Related Art

Sensing and monitoring technologies in many areas have adopted an IoT (Internet of Things) technology. However, there has not been much development related to the IoT technology in areas involving simple mechanical devices and components like tires and brake pads, which are utilized in autonomous and electric vehicles. Conventional brake pad technology includes two metal or ceramic pieces (e.g., a brake pad and a rotor) that make a noise when the brake pad and/or the rotor is worn out. A driver may hear the noise but may be unable to easily understand what is going on or readily diagnose any problem based on the noise. The driver has to then take the vehicle to a mechanic or a repair shop to get the noise investigated, and only then will the driver be able to get a more accurate sense of a state of the brake pad (e.g., how much is worn out, whether the brake pad is worn unevenly, etc.). Hence, there is a need for advanced vehicle systems and methods to accurately and efficiently sense brake or brake pad issues and notify the driver of the issues (which, without proper detection, may also lead to various safety issues related to a vehicle operation).

SUMMARY

Described herein is a system for detecting excessive or uneven wear on a brake pad or a rotor of a vehicle. The system includes a rotor connected to a wheel of the vehicle, a brake pad positioned adjacent to the rotor and configured to contact the rotor to slow down or stop movement of the rotor such that movement of the wheel is slowed down or stopped, and a wire mesh disposed within or integrated into the brake pad. The system also includes a caliper configured to house the brake pad and one or more pistons configured to push the brake pad against the rotor such that the brake pad, when pushed, contacts the rotor and slows down or stops the movement of the rotor. The system further includes a sensor configured to detect sensor data from the wire mesh and an electronic control unit (ECU) configured to determine, based on the sensor data, whether excessive or uneven wear on the brake pad or the rotor is present and to control a user interface (e.g., a touch display screen) to display an output related to the excessive or uneven wear on the brake pad or the rotor.

Also described is a method for detecting excessive or uneven wear on a brake pad of a vehicle. The method includes detecting, via a sensor connected to a wire mesh disposed within or integrated into the brake pad, sensor data related to a presence of at least a portion of the brake pad and determining, via an electronic control unit (ECU) coupled to the sensor and based on the detected sensor data and an artificial intelligence (AI) or machine learning model, that the excessive or uneven wear on the brake pad is present.

Moreover, also described is a vehicle including a system for detecting excessive or uneven wear on a brake pad of the vehicle. The vehicle includes a brake apparatus including the brake pad, one or more pistons, and a caliper housing the brake pad and the one or more pistons, a grid sensor including a wire mesh disposed within or integrated into the brake pad and configured to detect sensor data, and an electronic control unit (ECU) coupled to the brake apparatus and the grid sensor and configured to determine, based on the sensor data, whether excessive or uneven wear on the brake pad is present.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1:
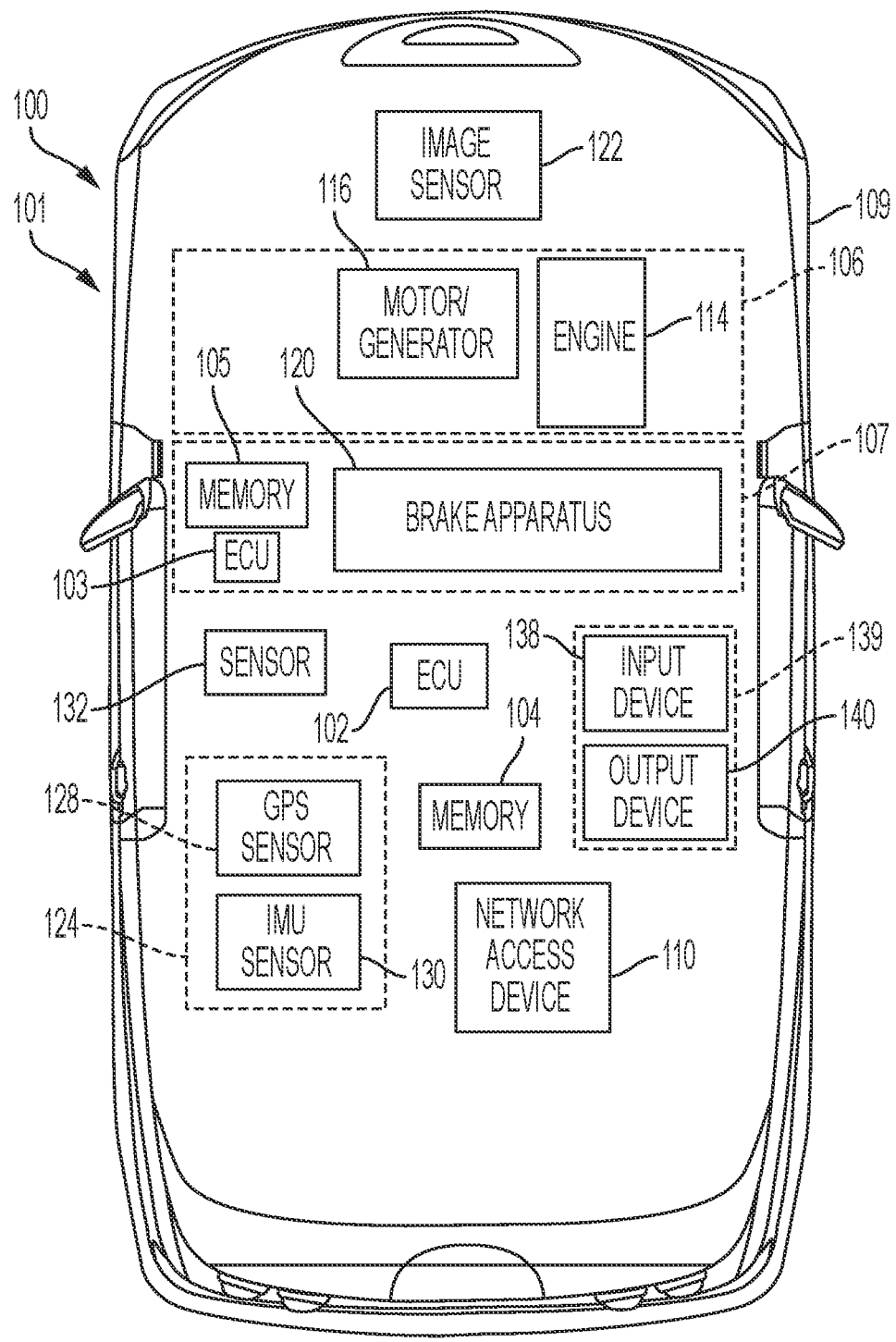
FIG. 1 is a block diagram illustrating a vehicle having a system for detecting excessive or uneven wear on a brake pad or a rotor of a vehicle according to an embodiment of the present invention.

The present disclosure describes systems and methods for detecting excessive or uneven wear on a brake pad or a rotor of a vehicle. These systems and methods provide many benefits and advantages such as accurately and efficiently sensing any brake or brake pad issues and notifying a driver of the issues by precisely detecting which portion(s) and how much of the brake pad is worn out. This is advantageous because the brake pad may wear out, in one example, unevenly (potentially shortening a lifespan of the brake pad) without the driver's knowledge. The lack of the driver's knowledge may be due to, e.g., a lack of a precise detection and location of which portion(s) and how much of the brake pad has been worn out. Information related to which portion(s) and how much of the brake pad has been worn out can provide additional information about why the brake pad was worn unevenly or how a brake caliper was not evenly applying pressure to the brake pad (e.g., related to a brake dust build-up within a caliper and/or between a brake pad and the caliper/piston, an inefficient brake fluid/oil application within the caliper leading to erratic movement of the piston(s) within the caliper, a driving behavior including hard/harsh braking at high speeds resulting in a non-linear momentum creating uneven pressure points on wheel/caliper/brake pad in a given direction, etc.). That is, the information related to uneven or excessive brake pad wear may be analyzed (in some embodiments with other types of data including data related to, e.g., driving behavior and/or pattern) to identify why the brake pad was worn unevenly. Also, such knowledge can be helpful in continuously improving a brake system based on the driver's behavior (e.g., in pressing a brake pedal) by, e.g., adjusting the pressure applied to the brake pad based on the pressing of the brake pedal (i.e., via actuating one or more components of the brake system to adjust the paths of the brake fluid, modifying how much brake fluid is applied for the piston(s) when, e.g., the brake pedal is applied). Moreover, such information may be utilized for an artificial intelligence (AI) or machine learning model (e.g., federated learning) to continuously improve the brake system.

Furthermore, the systems and methods described herein can provide the advantages and benefits of enabling an automatic and a dynamic adjustment of a brake apparatus including the brake pad based on the information related to which portion(s) and how much of the brake pad has been worn out. The automatic and dynamic adjustment of the brake apparatus can maximize available braking force (e.g., by maximizing a contact area between the brake pad and the rotor), as described herein.

An exemplary system for detecting excessive or uneven wear on a brake pad or a rotor of a vehicle is disclosed herein. The system includes a rotor connected to a wheel of the vehicle, a brake pad positioned adjacent to the rotor and configured to contact the rotor to slow down or stop movement of the rotor such that movement of the wheel is slowed down or stopped, and a wire mesh disposed within or integrated into the brake pad. The system also includes a caliper configured to house the brake pad and one or more pistons (also may be referred to as solenoids or cylinders) configured to push the brake pad against the rotor such that the brake pad, when pushed, contacts the rotor and slows down or stops movement of the rotor. The system further includes a sensor configured to detect sensor data from the wire mesh and an electronic control unit (ECU) configured to determine, based on the sensor data, whether excessive or uneven wear on the brake pad or the rotor is present and to control a user interface to display an output related to the excessive or uneven wear on the brake pad or the rotor. Such a system can advantageously enable sensing which portion(s) and/or how much of a brake pad have been worn out and notifying a driver regarding brake or brake pad issues.

The foregoing system may utilize a brake pad with electrical impedance material and/or a grid sensor (made of grid sensor material) or a wire mesh disposed within the brake pad and monitor the wearing of the brake pad. Furthermore, the foregoing system may automatically and dynamically change a braking force on a brake caliper, send information related to the brake pad condition to a user (e.g., a driver using a mobile device to receive the information) or an entity or individual associated with, e.g., an automotive OEM (original equipment manufacturer) such as an engineer, and/or enable an OTA (over-the-air) software update for the ECU to improve the brake system.

Turning to FIG. 1, a vehicle 100 is illustrated. The vehicle 100 may include a system 101 for detecting excessive or uneven wear on a brake pad or a rotor of the vehicle 100. The vehicle 100 (or system 101) may include a vehicle ECU 102, a memory 104, a torque source 106, a brake system 107, and a main body 109. The vehicle 100 (or system 101) may further include a network access device 110, an image sensor 122, a location sensor 124, and a sensor 132. Moreover, the vehicle 100 (or system 101) may also include an input device 138 and an output device 140, which together may be referred to as a user interface 139.

In some embodiments, the main body 109 may be propelled along a roadway. The main body 109 may resemble a vehicle such as a car, a bus, a motorcycle, a sports utility vehicle, a truck, or the like and support one or more individuals such as a driver, a passenger, or the like. Furthermore, the main body 109 may define or include a vehicle cabin (not shown) in which the driver, the passenger, or the like may be located.

The vehicle ECU 102 may be coupled to each of various components of the vehicle 100 and may include one or more processors or controllers which may be specifically designed and programmed for automotive systems. The functions of the vehicle ECU 102 may be implemented in a single ECU or in multiple ECUs. For example, the vehicle ECU 102 may include a torque ECU (not shown) that controls the torque source 106, a user interface ECU (not shown) that controls the user interface 139, or the like. The vehicle ECU 102 may receive data from one or more of the components of the vehicle 100, may make determinations based on the received data, and may control the operations of the one or more of the components based on the determinations. For example, the vehicle ECU 102 may receive a brake request from a brake pedal (not shown), may determine a brake operation based on the received brake request, and may cause one or more components of the brake system 107 (e.g., a brake apparatus 120) to be actuated so as to, e.g., slow down or stop movement of the vehicle 100. The vehicle ECU 102 and/or the brake system ECU 103 may also be configured to determine, based on the sensor data, whether excessive or uneven wear on the brake pad or the rotor is present and to control the user interface 139 (e.g., the output device 140) to display an output related to the excessive or uneven wear on the brake pad or the rotor.

The vehicle 100 may be non-autonomous, fully autonomous, or semi-autonomous. In that regard, the vehicle ECU 102 may control various aspects of the vehicle 100 (such as steering, braking, accelerating, or the like) to maneuver the vehicle 100 from a starting location to a destination location. In some embodiments, the vehicle 100 may be operated in an autonomous, semi-autonomous, or fully driver-operated state. In that regard, the vehicle 100 may be operated independently of driver control and, from time to time, without a person inside of the vehicle 100. The vehicle ECU 102 may facilitate autonomous functionality.

The brake system ECU 103 may be coupled to each component of the brake system 107 and may include one or more processors or controllers which may be specifically designed and programmed for automotive systems. The functions of the brake system ECU 103 (e.g., a dedicated ECU for the brake system 107 (e.g., for calipers)) may be implemented in a single ECU or in multiple ECUs. The brake system ECU 103 may monitor and/or control the brake system 107 to at least one of sense wearing of the brake pad (e.g., which portion(s) and/or how much of the brake pad have been worn out) or cause one or more components of the brake apparatus 120 (e.g., a caliper, one or more pistons, solenoids, cylinders, or the like) to be actuated. In some embodiments, the brake system ECU 103 may cooperate with the vehicle ECU 102 or solely operate to control the brake system 107.

The memory 104 may include any non-transitory memory and may store data usable by the vehicle ECU 102. The memory 104 may be located in or on the main body 109 and may be referred to as a local memory. In some embodiments, the memory 104 may be located remote from the main body 109 and may be referred to as a remote memory.

In some embodiments, the brake system ECU 103 may include a non-transitory memory 105 that may be the same as or separate from the memory 104. The brake system memory 105 may store data usable by the brake system ECU 103 to monitor and/or control operations of the brake system 107.

The torque source 106 may include one or more of an engine 114 or a motor-generator 116. The brake system 107 may include the brake apparatus 120 which is described in more detail throughout the present disclosure. As referenced herein, the vehicle ECU 102 may monitor and/or control operation of the torque source 106 (including the engine 114 and/or the motor-generator 116), and the vehicle ECU 102 and/or the brake system ECU 103 may monitor and/or control operation of the brake system 107 (e.g., including the brake apparatus 120).

The engine 114 may convert a fuel into mechanical power for propelling the vehicle 100. In that regard, the engine 114 may be a gasoline engine, a diesel engine, an ethanol engine, or the like. Optionally, the vehicle 100 may not include the engine 114 and may be an electric vehicle with the motor-generator 116.

The motor-generator 116 may convert, e.g., electrical energy stored in an energy storage device (not shown; the energy storage device may store the electrical energy and include one or more energy storage devices including a battery, a flywheel, a super capacitor, a thermal storage device, or the like) or received directly from, e.g., a fuel-cell circuit (not shown; the fuel-cell circuit may include a plurality of fuel cells (e.g., one or more fuel cell stacks) that facilitate a chemical reaction to generate electrical energy along with a system or systems for providing hydrogen and oxygen (or any other compounds)) into mechanical power usable to propel the vehicle 100. The motor-generator 116 may further convert mechanical power received from the engine 114 or from wheels of the vehicle 100 into electricity, which may be stored in the energy storage device (not shown) as energy and/or used by other components of the vehicle 100. In some embodiments, the motor-generator 116 may include a motor without a generator portion, and, in some embodiments, a separate generator may be provided.

As described further herein (e.g., with reference to FIG. 2), the brake apparatus 120 may include a brake pad, one or more pistons configured to push the brake pad against a rotor connected to a wheel of a vehicle to slow down or stop movement of the rotor (and that of the wheel). The brake apparatus 120 may include, e.g., disc-type brakes, drum-type brakes, or the like, as would be apparent to one or ordinary skill in the art and usable with various embodiments described herein.

The location sensor 124 may include any sensor capable of detecting data corresponding to a location of the vehicle 100. For example, the location sensor 124 may include one or more of a global positioning system (GPS) sensor 128, an inertial measurement unit (IMU) sensor 130, or the like. The GPS sensor 128 may detect data corresponding to a location of the vehicle 100. For example, the GPS sensor 128 may detect global positioning coordinates of the vehicle 100. The IMU sensor 130 may include one or more of an accelerometer, a gyroscope, or the like. The IMU sensor 130 may detect inertial measurement data corresponding to a position, a velocity, an orientation, an acceleration, or the like of the vehicle 100. The inertial measurement data may be used to identify a change in location of the vehicle 100, which the vehicle ECU 102 may track in order to determine the location of the vehicle 100.

The image sensor 122 may be connected to the main body 109 and may detect image data corresponding to an environment of the vehicle 100, data corresponding to a vehicle cabin (not shown), or the like. For example, the image sensor 122 may include a camera, a radar detector, a lidar detector, or any other image sensor capable of detecting light having any wavelength. The image sensor 122 may include one or multiple image sensors which may be oriented to detect image data in any direction relative to the main body 109 (and/or within the vehicle cabin). For example, the image sensor 122 may include four or more radar detectors to detect radar data on four or more sides of the main body 109. The image sensor 122 may also or instead include a first camera to detect image data in a forward direction relative to the main body 109 and a second camera to detect image data in a rear direction relative to the main body 109.

The sensor 132 may include one or more sensors capable of detecting a status of a vehicle component. For example, the sensor 132 may include a voltage sensor, a current sensor, a power sensor, an SOC (state of charge) sensor, or the like. In one example, the sensor 132 may detect data corresponding to a presence of at least a portion of a brake pad, indicating, e.g., which portion(s) and/or how much the brake pad has been worn out. The sensor 132 as used in conjunction with the brake system 107 is described in more detail throughout the present disclosure.

The input device 138 may include one or more input devices such as a button, a keyboard, a mouse, a touchscreen, a microphone, or the like. The input device 138 may receive input from a user of the vehicle 100 such as a driver or a passenger. The input device 138 may receive, for example, information corresponding to a request for cruise control, information usable to control an auxiliary component of the vehicle 100 (e.g., to control a navigation device or a stereo), or the like. In some embodiments, the input device 138 may include additional input device(s) usable to control the vehicle 100 such as an accelerator pedal, a brake pedal, a steering wheel, or the like. The input device 138 may also or instead receive information corresponding to a request for the vehicle 100 to drive autonomously.

The output device 140 may include any output device such as a speaker, a display, a touchscreen, or the like. The output device 140 may output data to a user of the vehicle. The output device 140 may, for example, output information corresponding to autonomous control of the vehicle 100, information relating to wearing and/or a remaining amount of the brake pad, or the like.

The network access device 110 may include any network access device capable of communicating via a communications protocol (e.g., a wireless protocol). For example, the network access device 110 may include a transceiver and communicate via Bluetooth, Wi-Fi, a cellular protocol, vehicle to vehicle (V2V) communications, Zigbee, or any other communications (e.g., wireless) protocol. The network access device 110 may be referred to as a data communication module (DCM) and may communicate with any device on the vehicle 100 and/or any remote device.

Figure 2:
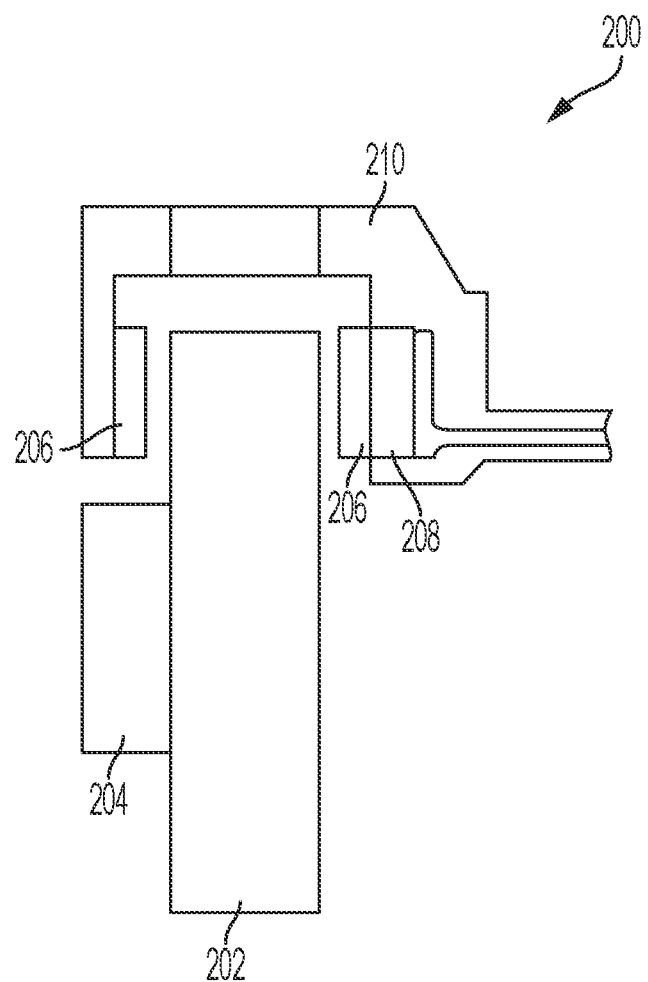
FIG. 2 is a cross-sectional view of a brake apparatus utilized with the system for detecting excessive or uneven wear on a brake pad or a rotor of a vehicle according to an embodiment of the present invention.

FIG. 2 is a cross-sectional view of a brake system 200 (e.g., the brake system 107) of a vehicle (e.g., the vehicle 100). The brake system 200 may include a rotor 202, a wheel 204, a brake pad 206, one or more pistons 208, and a caliper 210. One or more of these components may make up a brake apparatus (e.g., the brake apparatus 120). The rotor 202 may be connected to the wheel 204 of the vehicle 100. The brake pad 206 may be configured for contacting the rotor 202 to slow down or stop movement of the rotor 202 such that movement of the wheel 204 is slowed down or stopped. One or more pistons 208 may be configured to push the brake pad 206 against the rotor 202 such that the brake pad 206, when pushed, may contact the rotor 202 and slow down or stop the movement of the rotor 202. As shown, the caliper 210 may be configured to house the brake pad 206 and the one or more pistons 208. While a structure corresponding to a disc-type brake system is illustrated (e.g., in FIG. 2) and described herein, it would be apparent to one of ordinary skill in the art that the features described herein may also be usable with other types of a brake system (e.g., a drum-type) without departing from the spirit of the present disclosure and that such types of the brake system utilizing the features described herein would thus be within the scope of the present disclosure.

The brake system 200 may be connected to and/or utilize a sensor (e.g., the sensor 132) which is configured to detect sensor data related to a presence of at least a portion of the brake pad 206. Moreover, an electronic control unit (ECU) (e.g., the vehicle ECU 102 and/or the brake system ECU 103) may be coupled to the sensor and the caliper 210 and configured to detect, based on the sensor data, wearing of the brake pad. Additional details related to the sensor and the ECU are discussed throughout the present disclosure.

Figure 3:
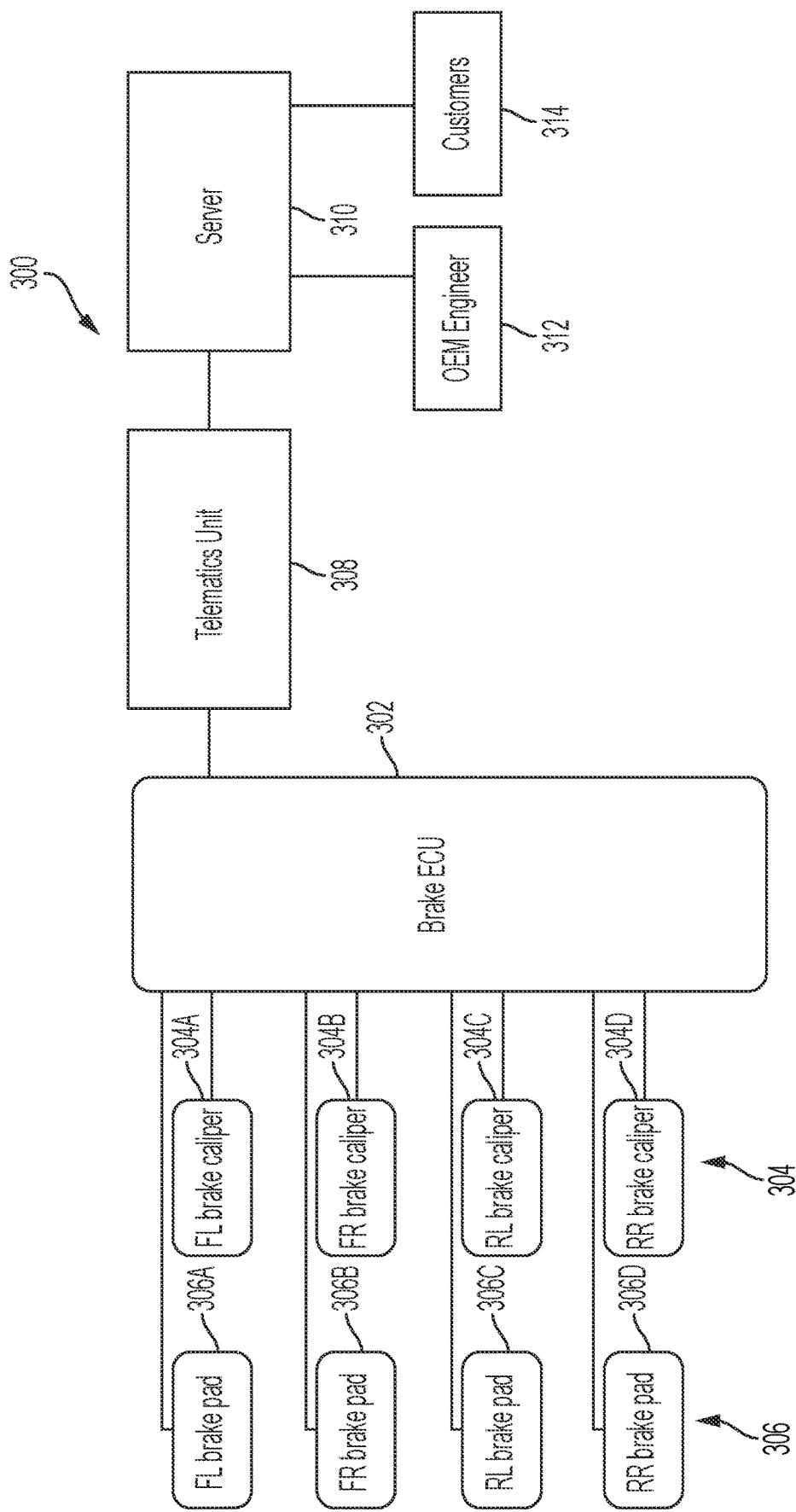
FIG. 3 is a block diagram of the system for detecting excessive or uneven wear on a brake pad or a rotor of a vehicle according to an embodiment of the present invention.

FIG. 3 is a block diagram of a system 300 for detecting excessive or uneven wear on a brake pad or a rotor of a vehicle (e.g., the vehicle 100). The system 300 (e.g., the brake system 107 or the brake system 200) may include a brake ECU 302 (e.g., the vehicle ECU 102 and/or the brake system ECU 103), a plurality of calipers 304 (e.g., the caliper 210), and/or a plurality of brake pads 306 (the brake pad 206), as well as a telematics unit 308, a server 310, an OEM (original equipment manufacturer) entity 312 such as an OEM computer or device or an engineer using the OEM computer or device, and/or a customer device or entity 314.

As shown, the plurality of brake calipers 304 may include a front left (FL) brake caliper 304A, a front right (FR) brake caliper 304B, a rear left (RL) brake caliper 304C, and a rear right (RR) brake caliper 304D. However, any number and/or combination of brake calipers may be used without departing from the spirit of the present disclosure.

Moreover, the plurality of brake pads 306 may include a FL brake pad 306A, a FR brake pad 306B, a RL brake pad 306C, and a RR brake pad 306D, as shown. Similar to the plurality of calipers 304, any number and/or combination of brake pads may be used without departing from the spirit of the present disclosure. For example, each of the calipers 304A-D may include two (2) brake pads. In some embodiments, data or information related to uneven or excessive brake pad wear may be utilized to enable detection and/or updates related to the whole brake system (e.g., related to balance or stability amongst the calipers 304A-D and/or the brake pads 306A-D) and/or individual ones of the calipers 304A-D and/or the brake pads 306A-D.

The brake ECU 302 may be connected to the plurality of brake calipers 304 and/or the plurality of brake pads 306 and monitor and/or control the plurality of brake calipers 304 and/or the plurality of brake pads 306.

As described herein, the plurality of brake pads 306 may be housed in the corresponding ones of the plurality of brake calipers 304. Thus, the FL brake pad 306A may be housed in the FL brake caliper 304A, the FR brake pad 306B may be housed in the FR brake caliper 304B, the RL brake pad 306C may be housed in the RL brake caliper 304C, and the RR brake pad 306D may be housed in the RR brake caliper 304D.

The brake ECU 302 may also be connected to a telematics unit 308 of the vehicle 100. The telematics unit 308 may be used for monitoring and/or controlling one or more components of the vehicle (e.g., the brake calipers 304 and/or the brake pads 306). For example, the telematics unit 308 may include one or more components of the vehicle (e.g., the vehicle 100) such as the brake system 107, the sensor 132, the network access device 110, etc. and may monitor and/or control the one or more components of the vehicle 100. In some embodiments, the telematics unit 308 may be connected to a server 310. In one example, the server 310 may be a remote server configured for communicating with the telematics unit 308 wirelessly and may be implemented via one or more computers.

The telematics unit 308 may gather information related to, e.g., wearing of the brake pad(s) 306 as described throughout the present disclosure and exchange information with the server 310 (e.g., wirelessly via the network access device 110 of the vehicle 100). For example, the telematics unit 308 may gather and transmit information related to the wearing of the brake pad 306 (e.g., which portion(s) and/or how much of the brake pad 306 has been worn out) and/or receive information related to modifying one or more operations of one or more components of the vehicle (e.g., a software update related to the brake ECU 302 for modifying operations of the brake calipers 304 based on the wearing of the brake pads 306).

The server 310 may be connected to the OEM entity 312 and/or the customer device or entity 314. The OEM entity 312 may be an engineer accessing information related to, e.g., the wearing of the brake pad(s) from the server 310 or one or more computers or devices utilized by the engineer to communicate with the server 310 to access the information related to, e.g., the wearing of the brake pad(s) from the server 310. In some embodiments, the OEM entity 312 may produce the software update discussed herein for updating a firmware or software associated with the brake ECU 302 and or the brake calipers 304 to modify, e.g., the operations of the brake calipers 304. In some embodiments, the OEM entity 312 may utilize the information related to the wearing of the brake pads 306 as received from the telematics unit 308 for designing improvement(s) (e.g., physical or firmware/software-related) for the brake ECU 302, brake calipers 304, brake pads 306, or the like.

Moreover, the customer device or entity 314 may be, e.g., a user device used by a driver, a passenger, or the like of a vehicle to receive information related to the wearing of the brake pad(s) 306. For example, the user device may be a device on or integrated within the vehicle 100, a smartphone, a tablet, or the like running an application (e.g., a software program) for displaying information related to the wearing of the brake pad(s). The user device may be used by the driver, the passenger, or the like to view the information related to the wearing of the brake pad(s) (e.g., which portion(s) and/or how much of the brake pad have been worn out, why the brake pad(s) may have worn out unevenly, suggested change(s) to driving and/or braking habit, etc.) and/or input an instruction or a confirmation to change an autonomous driving and/or operation (e.g., braking behavior) of the vehicle (e.g., based on the uneven wearing of the brake pad(s)).

Figure 4B:
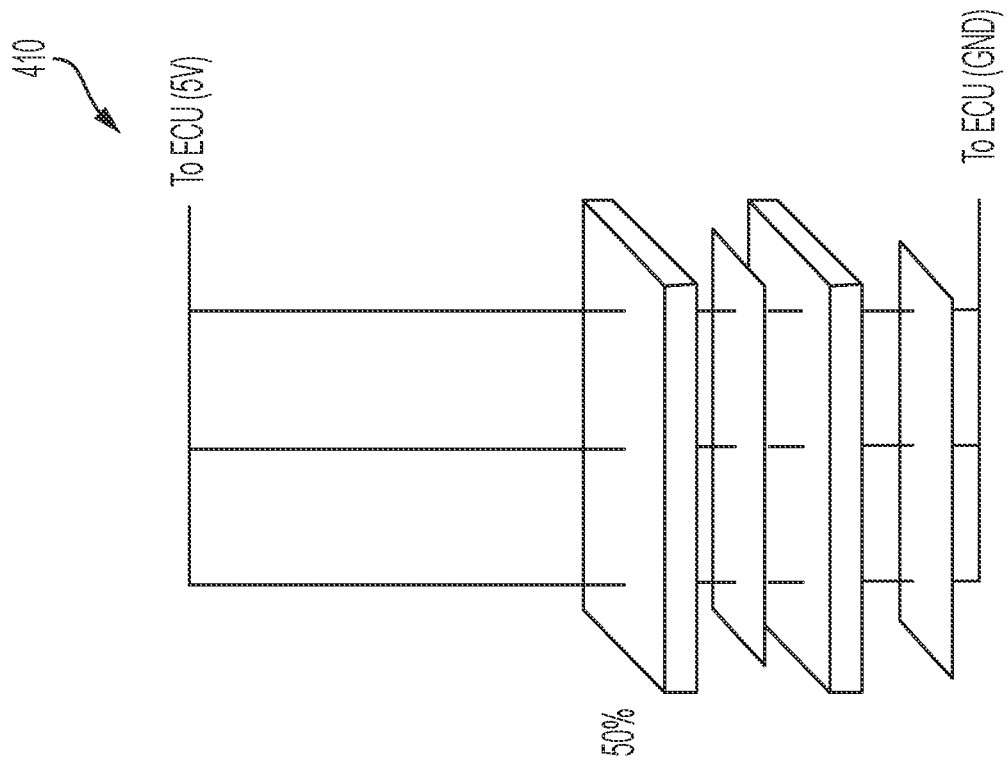
FIGS. 4A and 4B are illustrations of brake pads including electrical impedance material according to an embodiment of the present invention.
Figure 4A:
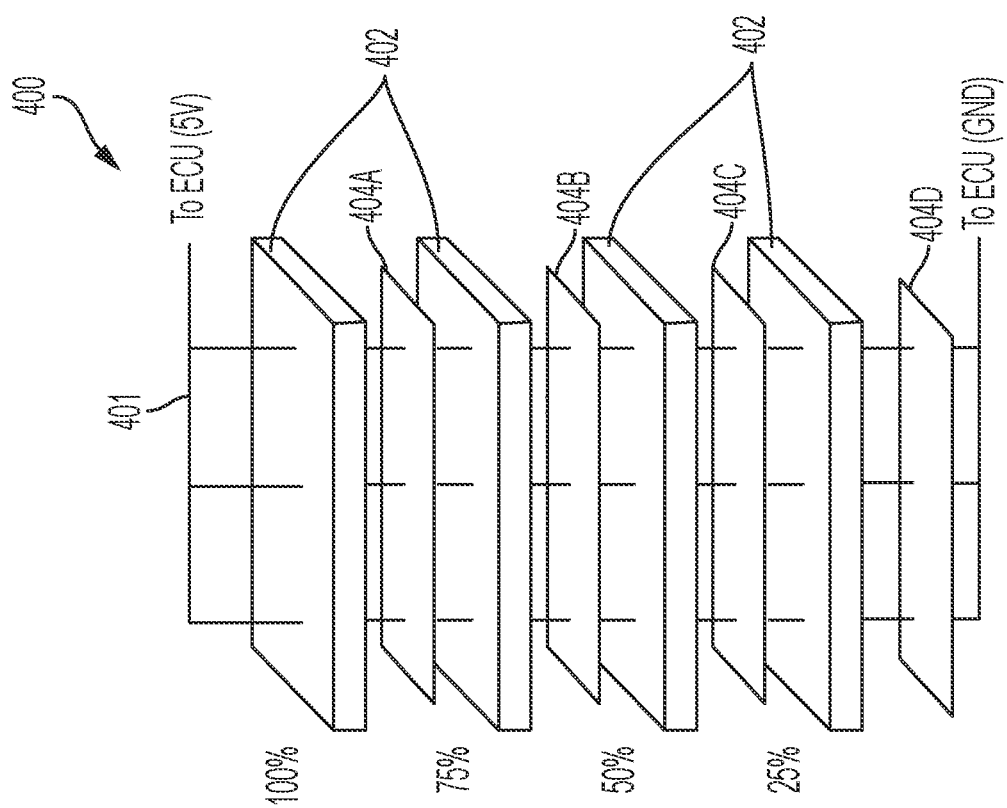

FIGS. 4A and 4B are illustrations of brake pads 400, 410 including electrical impedance material. Referring to FIG. 4A, the brake pad 400 may include a plurality of layers (e.g., 2-6 layers) of electrical impedance material 404A-D. As shown, in one example, there may be four (4) layers of electrical impedance material 404A-D disposed within the brake pad 400, each layer utilized for indicating wearing of 25% of the brake pad 400. However, it would be apparent to one of ordinary skill in the art that the number of layers of the electrical impedance material may vary and indicate various levels of wearing of the brake pad.

One or more wires 401 (sometimes referred to as a wire mesh) may connect the layers of electrical impedance material 404A-D to an ECU (e.g., the vehicle ECU 102, the brake system ECU 103, the brake ECU 302, or the like), wherein one end of the one or more wires 401 may be connected to a voltage source (e.g., of 5V) and another end of the one or more wires 401 may be connected to a ground (GND). In the example illustrated in FIG. 4A, when all layers of the electrical impedance material 404A-D are present and detected by the ECU 103, a sensor (e.g., the sensor 132) connected to the ECU 103 may detect (based on the amount of impedance of each layer of electrical impedance material (e.g., 1,000 ohms)) a prescribed level of current (e.g., 5V/(4×1,000 ohms)=1.25 mA), which may indicate that, e.g., at least 75% of the brake pad is remaining.

Now referring to FIG. 4B, the brake pad 410 with less than 50% of the brake pad remaining is illustrated. In this example, when a portion of the brake pad (e.g., 50% or more) has worn out, the top two layers of electrical impedance material (e.g., the layers 404A and 404B in FIG. 4A) would have worn out, and the remaining layers of electrical impedance material (e.g., the layers 404C and 404D) may yield less impedance based on the remaining layers of electrical impedance material (e.g., 2×1,000 ohms). Then, the detected level of current (e.g., 5V/(2×1,000 ohms)=2.5 mA) would indicate that only a percentage (e.g., more than 25% but less than 50%) of the brake pad remains after the aforementioned portion of the brake pad has worn out. Hence, the brake system ECU 103 may measure or receive the detected level of current from the sensor 132 and determine the amount of the brake pad which has been worn out.

As shown and referring back to FIG. 4A, the brake pad 400 may have the layers of electrical impedance material 404A-D between brake pad sections 402 to enable the ECU 103 to detect how much of the brake pad 400 has been worn out. In some embodiments, the layers of electrical impedance material 404A-D (which may be made of a different material than the brake pad sections 402) may be isolated from the brake pad material of the brake pad sections 402 to provide a more accurate measurement (e.g., by eliminating any effect of the brake pad material on the impedance encountered through the wires 401). Some examples of the electrical impedance material may include Manganin, Nickel Chromium alloy, Constantan, Gold Chromium, or the like. Moreover, the aforementioned isolation may be achieved, e.g., by utilizing a barrier made of non-conductive material around the electrical impedance material.

Figure 5B:
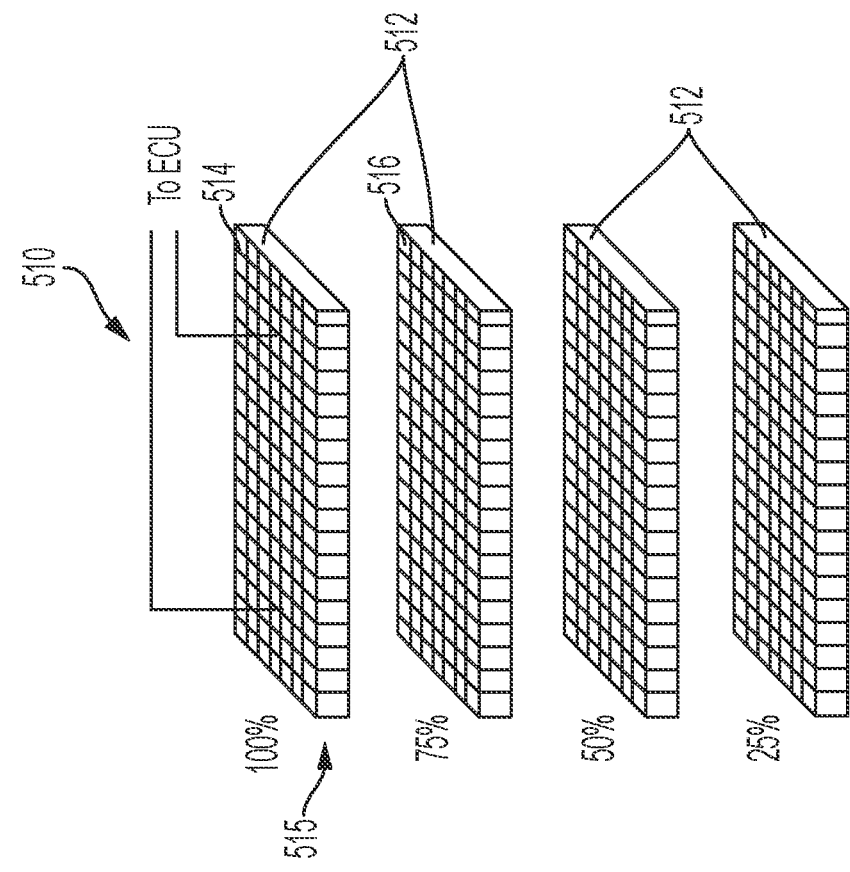
FIGS. 5A and 5B are illustrations of brake pads including, respectively, grid sensor material and a grid sensor or a wire mesh according to respective embodiments of the present invention.
Figure 5A:
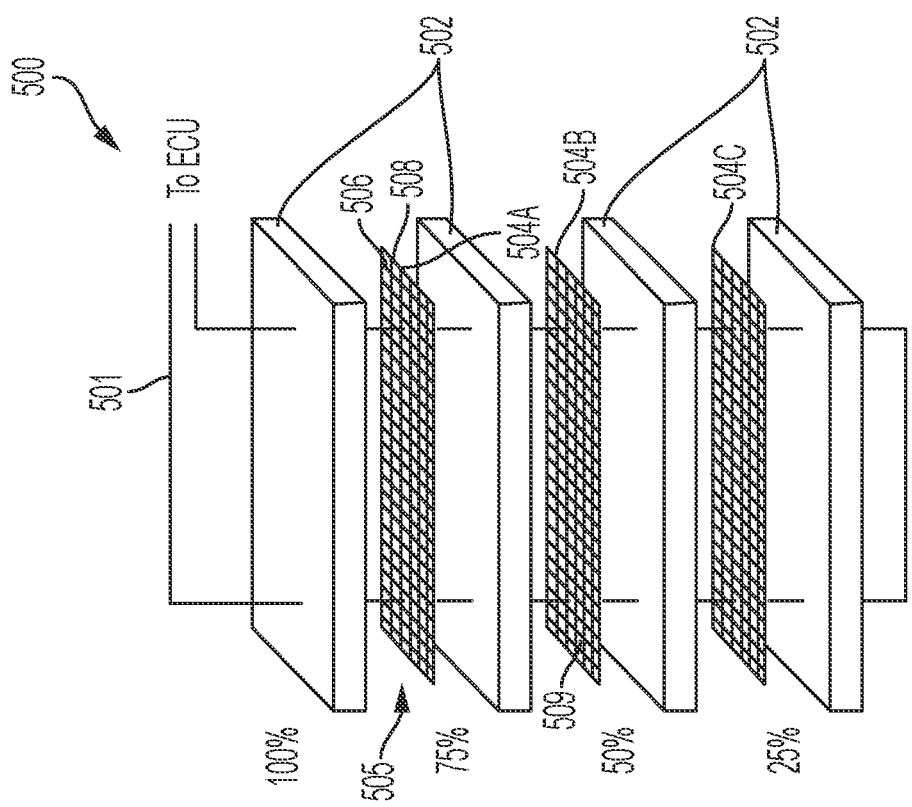

FIGS. 5A and 5B are illustrations of brake pads 500 and 510 including, respectively, grid sensor material and a grid sensor. Referring to FIG. 5A, the brake pad 500 may include a plurality of wires 506 (e.g., a wire mesh 505) disposed on a plurality of layers of grid sensor material 504A-C which may be connected to the ECU (e.g., the vehicle ECU 102, the brake system ECU 103, the brake ECU 302, or the like) via one or more wires 501. The plurality of wires 506 (wherein a plurality of first wires and a plurality of second wires may intersect at an angle (e.g., orthogonally) to form a plurality of regions 509 bounded by a pair of the first wires and a pair of the second wires) may form a wire mesh 505, and each layer of the grid sensor material 504A-C may form a sheet 508. The wire meshes 505 (e.g., made of the plurality of wires 506) may be utilized to monitor each of a plurality of sections of the brake pad layers 502 corresponding to the plurality of regions 509 of the wire meshes 505. For example, the wire meshes 505 may include a plurality of portions with resistive material (not shown) which may be utilized to determine the presence of the brake pad (e.g., the brake pad layers 502) based on, e.g., the current measured through the various portions of the wire meshes 505 when a predetermined level of voltage is applied. In some embodiments, the wires 501 and/or the wire meshes 505 may be connected to a voltage source and a ground to enable the determinations of the presence of the brake pad as described herein with reference to FIGS. 5A and 5B.

In some embodiments, each brake pad layer 502 may be monitored by its own wire mesh 505. Moreover, in some embodiments, the sheet 508 made of the plurality of regions 509 may itself be made of electrical impedance material with the wires 501 going through the plurality of regions 509 (e.g., some or all of the regions 509)—here, the plurality of regions 509 (i.e., of electrical impedance material) may be utilized to determine the presence of the brake pad (e.g., the brake pad layers 502) based on, e.g., the current measured through the wires 501 going through the plurality of regions 509. Any portion of the plurality of regions 509 (or the wire meshes 505) corresponding to a worn portion of the brake pad layer 502 may itself be worn out and not detected (i.e., the corresponding impedance may be removed), resulting in changed measurements of current indicating a presence or absence of the portion of the plurality of regions 509 (or the wire meshes 505) and accordingly that of the brake pad layer 502.

While only a limited amount of the wires 501 and 514 are shown in FIGS. 5A and 5B, it would be apparent to one of ordinary skill in the art that more wires/leads may be utilized to make more granular determinations relating to the presence of the brake pad (i.e., various portions of the brake pad). In various embodiments (with reference to FIG. 5A), the wires 501, the wire meshes 505, and/or the sheet 508 including the plurality of regions 509 may be made of material different from the material of the brake pad layers 502 and/or be isolated from the brake pad layers 502 (e.g., via a barrier made of non-conductive material), such that the measurements and sensing described herein are not impacted by the brake pad material.

The monitoring of the individual sections of the brake pad layers 502 may enable detecting, e.g., a non-uniform wearing of the brake pad (e.g., wherein a first portion corresponding to one or more regions of the regions 509 of the brake pad layer 502 may be more worn than a second portion corresponding to one or more other regions of the regions 509 of the brake pad layer 502). Moreover, the plurality of layers of grid sensor material 504A-C may be utilized for detecting a remaining percentage or amount of the brake pad material.

In some embodiments, the grid sensor of the wires 506 may include non-conductive material (e.g., glass, etc.) or separated from the brake pad material of the brake pad layers 502 (e.g., metal, ceramic, etc.). Such a separation (which may be achieved, e.g., by utilizing a barrier made of nonconductive material around the brake pad material) may allow more accurate monitoring of the brake pad layers 502 by, e.g., eliminating any effect of the brake pad material of the brake pad layers 502 on the monitoring.

Moreover, in some embodiments, if the brake pad is made from, e.g., ceramic (that is, a grid sensor or the brake pad may be made of conductive material), an impedance may be measured with the grid sensor or brake pad material itself, which may be utilized to make the determinations related to which portions of the brake pad may be worn. Further, if the material for the brake pad is conductive (and providing some impedance), the brake pad may then be isolated from all conductive material around the brake system (e.g., including caliper, wheel, axle, etc.) which may be grounded, such that the accuracy of the measurements described herein are not affected.

Based on data detected and monitored by the grid sensor described herein, a brake caliper (e.g., the caliper 210) with one or more solenoids or pistons (e.g., the one or more pistons 208) may automatically apply dynamic braking to maximize braking with a more even contact (e.g., of a greater area) across the brake pad to eliminate uneven wearing, e.g., only in a section of the brake pad layers 502. Such automatic and dynamic braking may improve braking power because the brake pad and a rotor may contact over a greater area than the contact area achievable without the automatic and dynamic braking.

Moreover, the ECU may detect when the wearing of the brake pad may have started to be uneven, wherein such information may be useful for an engineer to provide future countermeasures, as described further herein (e.g., with reference to FIG. 3). Some examples of the uneven or excessive brake pad wear may include: an inner pad wear, an outer pad wear, and a tapered wear. It would be apparent to one of ordinary skill in the art that these are merely some examples of different types of the uneven or excessive wear which may be observed with a brake pad—other patterns of uneven or excessive wear may also be detected by the systems and methods of the present disclosure. The foregoing information may be utilized by the engineer (e.g., of an automotive OEM) to design an OTA (over-the-air) software update for updating, e.g., the ECU and/or a brake apparatus including the brake pad and the brake caliper. The features described throughout the present disclosure (such as the aforementioned information related to when the wearing of the brake pad may have started to be uneven) may allow an owner of the vehicle to know how much of the brake pads are left in the vehicle and when the vehicle should be serviced (e.g., prior to encountering any issues). That is, a user may view or access such information on a vehicular display or a smartphone application and take preventative/proactive measures to address potential brake or brake pad issues. Moreover, such information may be utilized for a health check of a vehicle to show when a brake service should be done as a preventative/predictive maintenance (e.g., by predicting how much of the brake pad may wear out over how long of a period of time based on the detected data and information related to the wearing of the brake pad) to avoid an emergency or a failed braking system. The ECU may continuously detect and monitor the condition of the brake pad such that a braking performance may be improved.

Turning to FIG. 5B, in some embodiments, the wires 514 may be disposed throughout a portion or an entirety of the brake pad 510 (i.e., throughout all layers of the brake pad material 516). The wires 514 may also be positioned or disposed between layers of the brake pad material 516. Such three-dimensional structure of the wires 514 (e.g., a wire mesh "block" 515) may enable a more granular detection and monitoring of the wearing of the brake pad(s). In some embodiments, the remaining portion of the wire mesh block 515 and sensor data detected based on, e.g., the remaining portion of the wire mesh block 515 may be utilized to determine whether a maximum contact area (e.g., over threshold measurements) between the brake pad (e.g., the brake pad 206) and the rotor (e.g., the rotor 202) is being achieved. For example, the ECU (e.g., the vehicle ECU 102, the brake system ECU 103, the brake ECU 302, or the like) may detect different rates at which different portions of the brake pad are being worn out to determine whether the maximum contact area is being achieved (e.g., based on whether all portions of a surface of the brake pad are being worn at the same or similar rates).

Figure 6:
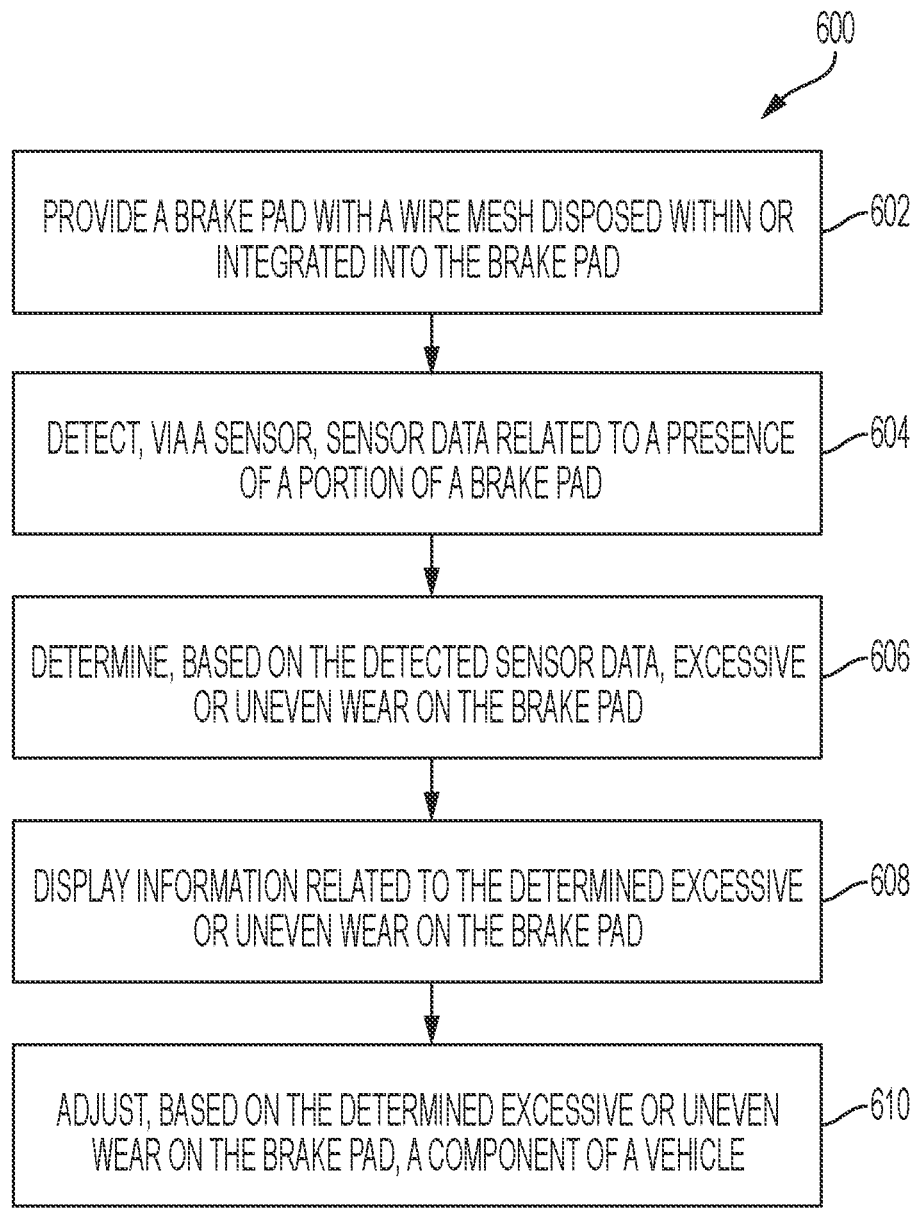
FIG. 6 is a flowchart illustrating a method for detecting excessive or uneven wear on a brake pad or a rotor of a vehicle according to an embodiment of the present invention.

FIG. 6 is a flowchart illustrating a method 600 for detecting excessive or uneven wear on a brake pad or a rotor of a vehicle by a system or vehicle described throughout the present disclosure with reference to, e.g., FIGS. 1-5B.

The system (e.g., the brake system 107, the system 300, or the like) described herein may provide a brake pad with a wire mesh disposed within or integrated into the brake pad (step 602). For example, a brake pad such as the brake pad 500 may be provided with the wire mesh 505 as described herein with reference to FIG. 5.

The system may also detect, via a sensor (e.g., the sensor 132), sensor data related to a presence of at latest a portion of a brake pad (step 604). For example, the ECU (e.g., the vehicle ECU 102, the brake system ECU 103, the brake ECU 302, or the like) may utilize the wire mesh 505 to detect sensor data related to whether one or more portions of the brake pad corresponding to one or more regions defined by one or more portions of the wire mesh 505 are present.

Then, the system may determine, based on the detected sensor data, excessive or uneven wear on the brake pad (step 606). For example, the ECU may determine, based on a first portion of the brake pad being present while a second portion of the brake pad is absent according to the detected sensor data, that there is an uneven wearing of the brake pad. That is, the first portion and the second portion of the brake pad may correspond to different portions of a surface of the brake pad defined by a plane parallel to a surface of a rotor, and the first portion being present while the second portion is absent according to the detected sensor data may indicate that the second portion of the brake pad has been worn out while the first portion of the brake pad has not.

For example, as described herein, the grid sensor including a wire mesh 505 and/or a wire mesh block 515 described with reference to FIGS. 5A and 5B may be utilized to detect the uneven (or non-uniform) wearing of the brake pad by determining that a particular portion of a brake pad layer has been worn out while another portion of the brake pad layer has not (or is less worn). Such a determination may be made by the grid sensor detecting sensor data related to various portions of the wire mesh 505 and/or the wire mesh block 515 corresponding to various portions of the brake pad.

Moreover, the method 600 may also include displaying, via a user interface (e.g., the output device 140 of the user interface 139), information related to the determined excessive or uneven wear on the brake pad (step 608). The displayed information may include, e.g., a percentage or an amount (e.g., a thickness) of the brake pad remaining. In one example, the information related to the remaining brake pad may be displayed as a graphical representation of the remaining brake pad. Such a graphical representation may visually show the uneven wearing of the brake pad, for example. In another example, the displayed information may also include a warning related to a remaining percentage or amount of the brake pad being at or below a threshold percentage or amount (e.g., equal to or less than 25% or 3 mm in thickness of the brake pad). Moreover, data related to one or more conditions of the brake pad triggering the aforementioned warning may be utilized by an ECU (e.g., the vehicle ECU 102, the brake system ECU 103, the brake ECU 302, or the like) to contact, via a transceiver (e.g., the network access device 110), a mechanic or a service shop to facilitate a preventative/predictive service for the brake pad as described herein.

Furthermore, the method 600 may also include adjusting, based on the determined excessive or uneven wear on the brake pad, a component of a vehicle (step 610). The adjustment may be for at least one of (i) a force to be applied by one or more pistons (e.g., the one or more pistons 208) on the brake pad (e.g., the brake pad 206) for contacting a rotor (e.g., the rotor 202) connected to a wheel (e.g., the wheel 204) of the vehicle (e.g., the vehicle 100) and/or (ii) an angle at which the brake pad (e.g., the brake pad 206), when pushed by the one or more pistons (e.g., the one or more pistons 208), contacts the rotor (e.g., the rotor 202). Such an adjustment may allow for a greater surface area of the brake pad to contact the rotor for slowing down or stopping movement of the rotor such that the brake pad may wear out more evenly than without the adjustment. The force to be applied by the one or more pistons may be adjusted by, e.g., adjusting the application of the brake fluid when a brake request is made (e.g., from pressing of a brake pedal). The angle at which the brake pad contacts the rotor may be automatically adjusted by, e.g., adjusting an orientation of the caliper housing the brake pad and the one or more pistons such that the orientation of the brake pad is tilted so as to contact the rotor by a greater surface area of the brake pad than without the adjustment. In some embodiments, the system described herein may utilize an artificial intelligence/machine learning algorithm (e.g., utilizing the detected data or information related to the wearing of the brake pad described herein as an input to such algorithm and performing a federated learning to continuously improve the brake system) to (i) predict when and how much of the aforementioned adjustment may be necessary and automatically actuate the adjustment by the ECU and/or the brake apparatus described herein and/or (ii) predict when a service may be required for the brake pad and automatically facilitate, e.g., scheduling of the service by contacting a repair shop or a mechanic via, e.g., a communications device on the vehicle (utilizing, e.g., the network access device 110). In some embodiments, the detected data or information related to the uneven or excessive wear of the brake pad described herein may be transmitted to and stored in a remote server so that the data or information may be utilized to enable, e.g., the software update and/or federated learning described herein. In some embodiments, such data or information may be stored locally, so that the updates to the brake system (e.g., through federated learning) may be more customized and specific to the vehicle on which the data or information are stored.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for detecting excessive or uneven wear on a brake pad of a vehicle, the system comprising:
    a rotor connected to a wheel of the vehicle;
    a brake pad positioned adjacent to the rotor and configured to contact the rotor to slow down or stop movement of the rotor such that movement of the wheel is slowed down or stopped;
    a wire mesh disposed within or integrated into the brake pad;
    a sensor configured to detect sensor data from the wire mesh;
    an output device to display an output related to the excessive or uneven wear on the brake pad or the rotor; and
    an electronic control unit (ECU) configured to:
        determine, based on the sensor data, whether excessive or uneven wear on the brake pad or the rotor is present and to control the output device to display the output related to the excessive or uneven wear on the brake pad or the rotor,
        determine, based on the sensor data, a higher level of wear in a first portion of the brake pad than in a second portion of the brake pad, and
        adjust, based on the determined excessive or uneven wear on the brake pad at least one of a force to be applied by one or more pistons for pushing the brake pad or an angle at which the brake pad, when pushed by the one or more pistons, contacts the rotor.

2. The system of claim 1, further comprising a caliper configured to house the brake pad and the one or more pistons configured to push the brake pad against the rotor such that the brake pad, when pushed, contacts the rotor and slows down or stops the movement of the rotor.

3. The system of claim 2, wherein the adjustment of the angle at which the brake pad contacts the rotor includes an adjustment of an orientation of the caliper.

4. The system of claim 1, wherein the wire mesh includes a plurality of first wires intersecting with a plurality of second wires orthogonally, the first wires and the second wires forming a plurality of regions each bounded by a pair of the first wires and a pair of the second wires.

5. The system of claim 4, wherein the sensor data includes a plurality of data each related to a respective region of the plurality of regions and indicating a presence of a corresponding portion of the brake pad at the respective region.

6. The system of claim 5, wherein the wire mesh further includes a plurality of sheets of wire mesh, separated by a predetermined distance between the sheets and each sheet configured for detecting the presence of the at least portion of the brake pad at a layer of the brake pad including a plane parallel to a surface of the rotor.

7. The system of claim 5, wherein the wire mesh includes a wire mesh block disposed through a portion or an entirety of the brake pad.

8. A method for detecting excessive or uneven wear on a brake pad of a vehicle, the method comprising:
    detecting, via a sensor connected to a wire mesh disposed within or integrated into the brake pad, sensor data related to a presence of at least a portion of the brake pad;

determining, via an electronic control unit (ECU) coupled to the sensor and based on the detected sensor data and an artificial intelligence (AI) or machine learning model, that the excessive or uneven wear on the brake pad is present;

determining, via the ECU coupled to the sensor and based on the detected sensor data and the AI or machine learning model, a higher level of wear in a first portion of the brake pad than in a second portion of the brake pad; and adjusting, based on the determine excessive or uneven wear on the brake pad, at least one of a force to be applied by one or more pistons for pushing the brake pad or an angle at which the brake pad, when pushed by the one or more pistons, contacts a rotor connected to a wheel of the vehicle.

9. The method of claim 8, wherein the first portion and the second portion are on a plane across the brake pad parallel to a surface of the rotor positioned adjacent to the brake pad.

10. The method of claim 8, wherein the one or more pistons are configured to push the brake pad against the rotor such that the brake pad, when pushed, contacts the rotor and slows down or stops the movement of the rotor.

11. The method of claim 8, further comprising displaying, via a user interface, information related to the determined excessive or uneven wear on the brake pad.

12. The method of claim 11, wherein the displaying of the information related to the determined excessive or uneven wear on the brake pad includes displaying a percentage or an amount of the brake pad remaining.

13. The method of claim 11, wherein the displaying of the information related to the determined excessive or uneven wear on the brake pad includes displaying a warning related to a remaining percentage or amount of the brake pad being at or below a threshold percentage or amount.

14. The method of claim 11, wherein the displaying of the information related to the determined excessive or uneven wear on the brake pad includes displaying information related to a non-uniform wear on the brake pad including the higher level of wear in the first portion of the brake pad than in the second portion of the brake pad, the first portion and the second portion being on a plane across the brake pad parallel to a surface of the rotor positioned adjacent to the brake pad.

15. A vehicle including a system for detecting excessive or uneven wear on a brake pad of the vehicle, the vehicle comprising:

a brake apparatus including the brake pad, one or more pistons, and a caliper housing the brake pad and the one or more pistons;

a grid sensor including a wire mesh disposed within or integrated into the brake pad and configured to detect sensor data; and an electronic control unit (ECU) coupled to the brake apparatus and the grid sensor and configured to;

determine, based on the sensor data, whether excessive or uneven wear on the brake pad is present, determine, based on the sensor data, a higher level of wear in a first portion of the brake pad than in a second portion of the brake pad, and adjust, based on the determined excessive or uneven wear on the brake pad, at least one of a force to be applied by the one or more pistons for pushing the brake pad or an angle at which the brake pad, when pushed by the one or more pistons, contacts a rotor connected to a wheel of the vehicle.

16. The vehicle of claim 15, wherein the first portion and the second portion are on a plane across the brake pad parallel to a surface of the rotor positioned adjacent to the brake pad and connected to the wheel of the vehicle.

17. The vehicle of claim 15, further comprising a user interface coupled to the ECU; and wherein the ECU is further configured to display, via the user interface, information related to the determined excessive or uneven wear on the brake pad.

18. The vehicle of claim 15, further comprising a transceiver coupled to the ECU; and wherein the ECU is further configured to:

transmit, via the transceiver and to a remote server, data related to the determined excessive or uneven wear on the brake pad, and receive, via the transceiver, data related to a software update associated with the ECU or the brake apparatus of the vehicle.

19. The vehicle of claim 15, wherein the ECU is a dedicated ECU configured to control only the brake apparatus of the vehicle.

20. The vehicle of claim 15, wherein the ECU is further configured to control one or more other components unrelated to the brake apparatus of the vehicle.

* * * * *